Figure 1:
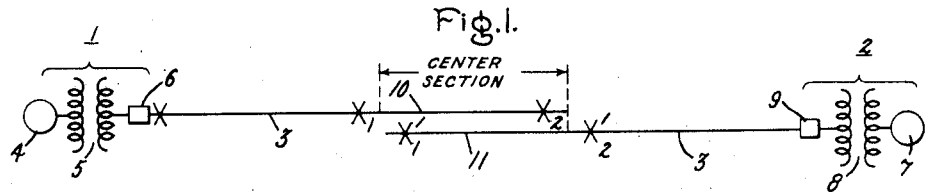

Sept. 1, 1942.   S. B. CRARY   2,294,773

SERIES CAPACITOR ARRANGEMENT

Filed June 14, 1941

Inventor:
Selden B. Crary,
by Harry E. Dunham
His Attorney.

Patented Sept. 1, 1942

2,294,773

UNITED STATES PATENT OFFICE 2,294,773

SERIES CAPACITOR ARRANGEMENT

Selden B. Crary, Schenectady, N. Y., assignor to General Electric Company, a corporation of New York Application June 14, 1941, Serial No. 398,137

13 Claims. (Cl. 172—237)

This invention relates to series capacitors in alternating-current power lines and more particularly to the proper location and distribution of series capacitors in such lines. All lines and their terminal equipment are inherently inductive and the function of the series capacitor is to neutralize a predetermined amount of this inductance so as to reduce the impedance of the line. This increases the synchronous-to-synchronous power limits of the line and reduces the voltage regulation. Studies of long lines indicate that 100% compensation (neutralization) or over is undesirable as some inductive line reactance is ordinarily necessary for stability of the system.

Practically all lines are provided with terminal circuit breakers so that they may be electrically isolated whenever desired, as when a fault occurs on them. The severest faults are dead short circuits and the maximum fault current results from a terminal short circuit because in that case only the impedance of the terminal equipment limits the fault current whereas when the fault is out on the line the impedance of the line between the fault and the line terminal is added to the impedance of the terminal equipment. Consequently, the terminal circuit breakers must be capable of interrupting the terminal short circuit current. However, when a series capacitor is inserted in a line it has sometimes been found that the current resulting from a fault at certain places on the line will substantially exceed the terminal short circuit current. This means that the maximum current through the circuit breaker is increased and consequently the size or rating of the circuit breaker should be increased in order to maintain the factor of safety required by good practice. However, on long, high voltage lines these circuit breakers are already large and very expensive pieces of equipment and it is highly undesirable to increase their size and cost if it can be avoided.

I have found that some line fault currents on compensated lines exceed the terminal short circuit current because the series capacitor actually overcompensates the section or part of the line between the fault and the line terminal being considered even though the capacitor does not completely compensate the whole line. The result is that this overcompensated line section neutralizes at least some of the inductive reactance of the terminal equipment so that the effective impedance for limiting the fault current is actually less than the impedance of the terminal equipment alone.

One way to avoid this result is to take the series capacitor out of service by short circuiting it whenever the current through it exceeds a predetermined value. This can be done by conventional overvoltage protective equipment for series capacitors by reason of the known relation between the current and voltage of a capacitor. However, it is often desirable to reduce the probability of the protective means operating in order to keep full capacitive kva. in the circuit during the period of disturbance. This is particularly true for long lines and even more so for multiple circuit lines where the power limits are of especial importance. Furthermore, the protective equipment usually is not fast enough to limit fully the peak instantaneous transient short circuit current.

In accordance with one aspect of the invention certain relationships have been found whereby when the desired total amount of line compensation by series capacitance is decided upon the optimum location or distribution of the capacitance can be determined from the standpoint of short circuit currents. By optimum is meant the location or distribution which will result in the minimum circuit breaker and capacitor current from a short circuit at the worst point on the line, the worst point being the one which produces higher short circuit current than any other point on the line. As the series capacitor fundamental frequency voltage is proportional to its fundamental frequency current this also permits the use of minimum size and cost capacitors.

It may sometimes be desirable to divide the entire line into substantially equal length sections separated by substantially equal size capacitors. In accordance with another aspect of the invention the minimum number of such capacitors necessary to prevent the maximum short circuit current from exceeding the terminal short circuit current is determined. In addition the optimum number of such capacitors for producing minimum capacitor voltage stresses and minimum short circuit current is also determined.

An object of the invention is to provide a new and improved series capacitor compensated transmission line.

Another object of the invention is to provide a series capacitor compensated transmission line having an optimum arrangement of its series capacitance.

A further object of the invention is to provide a series capacitor compensated transmission line having the minimum number of equal-size equally spaced series capacitors necessary to prevent the maximum line short circuit current from exceeding the terminal short circuit current.

An additional object of the invention is to provide a transmission line which is compensated by the optimum number of equal-size equally-spaced series capacitors.

A still further object of the invention is to provide an arrangement for reducing the cost of series capacitors when applied in electric circuits.

The invention will be better understood from the following description taken in connection with the accompanying drawing and its scope will be pointed out in the appended claims.

Figure 2:
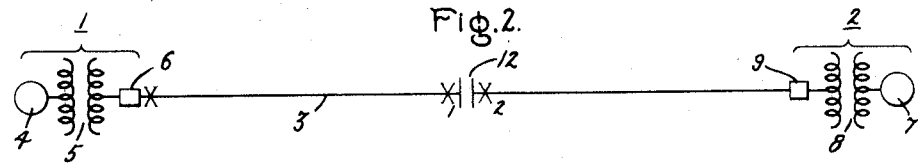
Figure 3:
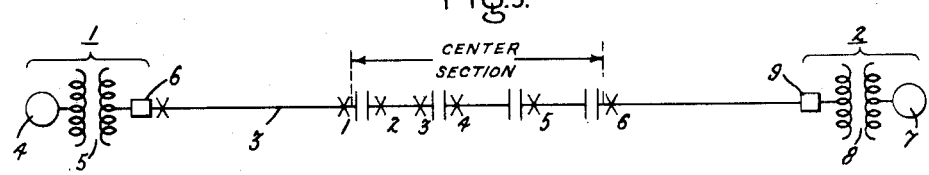
Figure 4:
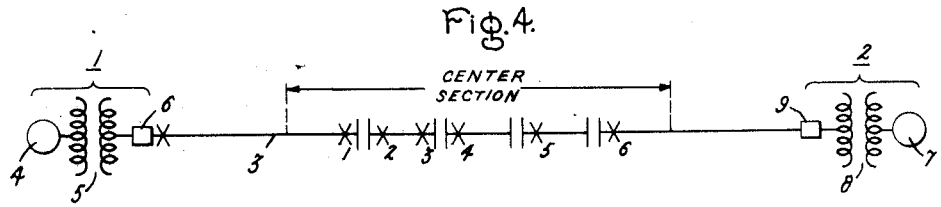
Figure 5:
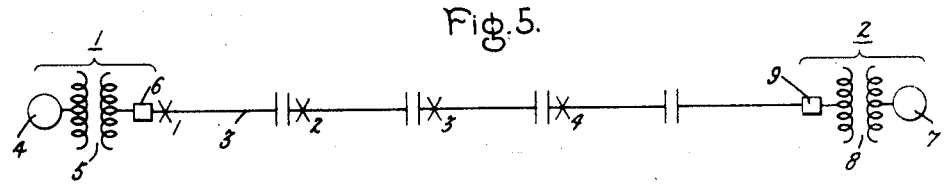
Figure 6:
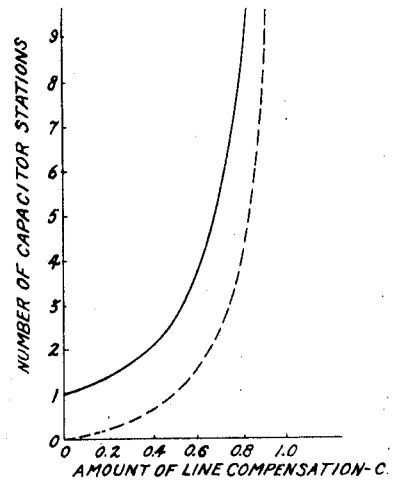

In the drawing Fig. 1 illustrates schematically an embodiment of my invention which provides the optimum location and arrangement of series capacitance from the standpoint of minimum current through the series capacitance and line circuit breaker for a short circuit at the worst point on the line, Fig. 2 illustrates schematically a modification of the invention when all of the required series capacitance is lumped in a single series capacitor installation, Fig. 3 is a modification in which the required amount of series capacitance is divided between a plurality of equal series capacitor installations which are equally spaced in a center section of the line, Fig. 4 is a modification similar to Fig. 3 but in which the center section is defined differently so as to provide a generalization of the preceding figures, Fig. 5 is a modification in which the required amount of series capacitance is divided among a plurality of equal size series capacitor installations which in turn divide the line into equal length sections or spacings, and Fig. 6 is a pair of curves showing the relation between the number of capacitor stations and the amount of line compensation in order to prevent the short circuit current from exceeding the terminal short circuit current and for causing the line short circuit current to be a minimum respectively.

Referring now to the drawing and more particularly to Fig. 1, there is shown therein an alternating current power system comprising a generating station 1 and a receiving station 2, the two being interconnected by a transmission circuit or line 3. The generating station, which may be of any well-known type, comprises, for example, a standard 60-cycle-per-second synchronous generator 4, a voltage step-up transformer 5 and a high voltage circuit breaker 6. Similarly, the receiving station 2 comprises a synchronous machine 7, a step-down power transformer 8 and a high voltage circuit breaker 9.

The line 3 has a substantial amount of distributed inductance and in order to neutralize or compensate for a predetermined fractional amount of this inductance series capacitance is inserted in the line. This series capacitance is inserted in a center section of the line, that is to say, it is inserted over a predetermined part of the line which extends for equal distances on both sides of the center point of the line. It is a distributed capacitance which is characterized by having a capacitive reactance per unit length of the line which is equal in magnitude to the inductive reactance per unit length of the line. In other words, the center section of the line is 100% compensated.

One way of securing distributed series capacitance is to have the center section of the line consist of overlapping electrically disconnected line conductors 10 and 11. These may be of such area and spacing as to constitute in effect a capacitor, the plates of which are the overlapping portions 10 and 11 of the line conductors.

If the entire line is assumed to have a length of unity and the required decimal amount of series capacitor compensation is denoted by C, then it will be seen that the length of the center section may also be denoted by C. For example, if it is desired to compensate the entire line for one-quarter of its inductive reactance the length of the center section C will be .25 of the length of the entire line. Each of the two equal remaining end sections will then be equal to $$\frac{(1-C)}{2}$$

The operation of Fig. 1 is as follows: Assume that power is flowing from left to right and that a terminal short circuit occurs on the line at point X. This will produce a fault current through the circuit breaker 6 which is limited only by the impedance of the terminal equipment consisting essentially of the alternator 4 and the transformer 5. On an ordinary uncompensated line this is the worst place for a fault for breaker 6 as it produces the highest short circuit current. Assume now that the short circuit occurs at point $X_1$ instead of at X. The current through the circuit breaker 6 will now be limited by the additional impedance of the end section of the line between the points X and $X_1$ so that the current through the circuit breaker 6 from a fault at $X_1$ will be less than for the terminal short circuit at X. Assume now that the short circuit occurs at point $X_2$ which is located immediately to the right of the center section as viewed in the drawing. Under these conditions the resulting current through the circuit breaker 6, and incidentally through the series capacitance, will be substantially of the same magnitude as when the fault occurred at $X_1$. This is because the center section is completely compensated so that the overall reactance between the generator 4 or source of current and the fault will be the same for both $X_1$ and $X_2$.

By reason of the symmetry of the line the results are also the same with respect to the circuit breaker 9, that is to say, the current through the circuit breaker 9 resulting from faults at $X_2$ and $X_1$ will be the same and will be a minimum in comparison with any other faults occurring between $X_2$ and the circuit breaker 9.

In case the terminal system reactances are not equal the current for a terminal fault may be greater at one terminal than the other. However, since the line reactance will ordinarily be larger than the terminal transient reactances the capacitor location is not greatly influenced by inequality of the terminal reactances. Furthermore, since the terminal reactances are influenced by changes in system connections it becomes more practical to design the system on the basis of equal terminal reactances.

If the center section were more than 100% compensated, that is to say, if it had a greater capacitive reactance than it had inductive reactance per unit of length, then the circuit breaker currents for faults at $X_1$ and $X_2$ would not be the same and they would be higher for the fault on the opposite side of the series capacitance with respect to the circuit breaker being considered. This is because the center section would then have a net capacitive reactance which would neutralize some of the inductive reactance of the series connected end section so that the overall impedance for limiting the fault current would be less.

On the other hand, if the center section were less than 100% compensated it would mean an increase in the length of the center section and consequently a decrease in the lengths of the end sections. This in turn would cause an increase in the fault current at a point $X'_1$ for circuit breaker 6 and at a point $X'_2$ for circuit breaker 9. It will be noted that $X'_1$ represents a fault on conductor 11 and $X'_2$ a fault on conductor 10. Consequently, all of the capacitance is between $X'_1$ and circuit breaker 6 or between $X'_2$ and a circuit breaker 9. This is one objection to an absolutely continuous capacitance distribution in the center section. It can be avoided, although approached as closely as desired, by using a large number of small, closely spaced series capacitors to produce an otherwise equivalent effect.

The insertion of a predetermined amount of distributed series capacitance in the center section of a line is not at the present time the most practical way of compensating a line for its inductive reactance. Another way of obtaining the desired amount of compensation is shown in Fig. 2 in which the necessary amount of capacitive reactance is lumped in a single series capacitor installation 12 which is located at the center of the line. This is the best place for a single series capacitor from the standpoint of magnitude of short circuit currents and voltage stress on the capacitor, it being remembered that voltage stress is a function of the current through the capacitor. By placing the capacitor in the center of the line the maximum amount of line inductive reactance will be in series with the capacitor for a fault adjacent the capacitor and on the opposite side thereof from the circuit breaker under consideration. This arrangement, however, is only practical for maximum values of C up to .5. If C exceeds .5 then the overall reactance between a fault at $X_2$ and the generator 4 will be less than the terminal reactance so that the fault current will exceed the terminal short circuit current which is undesirable for the reasons previously mentioned.

In Fig. 3 the required amount of capacitor compensation is divided up among a plurality of equal capacitor installations. The optimum arrangement of such capacitors is to locate them in a center section which extends for equal distances on both sides of the center point of the line and to so space them that the inductive reactance of the lengths of the line separating them equals the capacitive reactance of the capacitor installations. If the number of capacitor installations is $n$ then $$\frac{C}{n}$$

will be the length of line between capacitor installations as a decimal fraction of the length of the whole line as unity. As there will be $(n-1)$ spaces between the capacitor installations the length of the center section will be $$\frac{C(n-1)}{n}$$

With such an arrangement the worst place for a fault will be at $X_2$ because for a fault anywhere between X and $X_1$ there is, of course, no series capacitance for increasing the fault current through the circuit breaker 6. At $X_3$ the current is reduced from that at $X_2$ by impedance of the length of the line between capacitors. At $X_4$ the fault current will be the same as at $X_2$ because between $X_2$ and $X_4$ the portion of the line is 100% compensated. The same thing is true of faults at $X_5$ and $X_6$ so that there will be no increase in fault current through the circuit breaker 6 or a fault at $X_6$ over a fault at $X_2$.

As with Fig. 1 any closer spacing of the capacitors corresponding to an increase in the effective percentage compensation of the center section will cause the current for a fault at $X_6$ to be higher than the current for a fault at $X_2$ and similarly any increase in the space between capacitor installations corresponding to the decrease of the effective percentage compensation of the center section will decrease the length of the end sections so that the fault current at $X_2$ will be higher than for the optimum arrangement wherein the spacing is such that the center section is effectively 100% compensated.

There is, however, a limiting condition for the arrangement shown in Fig. 3 which occurs when the center section becomes so long that the end sections are less than the spacing between capacitor installations. When this happens the current for a fault at $X_2$ will be higher than the terminal fault current at X.

In order to prevent this the center section can be defined as in Fig. 4 wherein it is divided into $(n+1)$ rather than $(n-1)$ equal sections. This merely means that the center section has been extended at both ends by a section or length of line equal to the spacing between the capacitors or in other words equal to $$\frac{C}{n}$$

In this arrangement when the center section equals 1 or in other words, equals the length of the line, there will still be an amount of inductive reactance between X and $X_1$ equal to the capacitive reactance of the first capacitor so that the current resulting from a fault at $X_2$ will be substantially equal to but will not exceed the terminal short circuit current.

For certain reasons connected with the relaying or protection of power lines it is sometimes desirable to divide them into substantially equal length sections. In such cases it is of advantage to locate the series capacitors between the terminals of these sections. In these cases the problem is to determine the optimum number of substantially equal equally-spaced series capacitors for providing the required amount of compensation rather than determining the optimum arrangement or spacing of a given number of capacitors.

Fig. 5 shows an arrangement in which the capacitors divide the line into substantially equal length sections. As shown by way of example there are four capacitors which divide the line into five equal length sections. With such an arrangement the worst place for a short circuit is on the line side, as opposed to the source or line terminal side, of the first capacitor, this being shown as the point $X_2$ with respect to the left-hand terminal of the line. This of course is only true when the amount of compensation is less than 100% but these are the only cases which are here considered because as has previously been mentioned it has been found that some line inductance is usually desirable from the standpoint of synchronous system stability. Thus, as faults occur successively further out on the line at $X_3$ and $X_4$ etc., there is an increasing amount of net inductive reactance inserted between the fault and the source.

If the required amount of compensation is divided up among $n$ equal series capacitor installations so spaced that they divide the line into $(n+1)$ equal sections, then the limiting condition for preventing the fault current at $X_2$ from exceeding the terminal fault current at $X$ will be for the reactance of each line section to be equal to the reactance of each capacitor. In other words, if the entire line has a reactance of unity then the reactance of each section will be $$\frac{1}{(n+1)}$$

Also the reactance of each capacitor will be $$\frac{C}{n}$$

If we make $$\frac{1}{(n+1)}=\frac{C}{n}$$

and solve for $n$ we find that $$n=\frac{1}{(1-C)}$$

which is the minimum number of equal size equally spaced series capacitors which can be inserted in a line to produce a compensation of $C$ without having the fault current at $X_2$ exceed the fault current at $X$. Solving the above equation for $C$ also shows that $C$ should not exceed $$\frac{n}{(n+1)}$$

I have also found that there is a definite optimum number of equal size equally spaced series capacitors which will produce a minimum ratio of fault current at $X_2$ to fault current at $X$ and this may be expressed by the formula $$n=\frac{C+\sqrt{C^2-C+1}}{(1-C)}$$

For any other number of capacitors the ratio of the current at $X_2$ to the current at $X$ will be higher.

In Fig. 6 the dashed curve shows the minimum number of equally spaced equal kva. capacitor stations for preventing the current at $X_2$ from exceeding the current at $X$ and the solid curve shows the optimum number of equal size equal spaced capacitors for obtaining a minimum ratio of fault current at $X_2$ to fault current at $X$.

While there have shown and described particular embodiments of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. In combination, a long distance high voltage transmission line for alternating current power at commercial frequency, said line having substantial inherent inductive reactance at said frequency, and a plurality of series capacitors connected in said line at spaced intervals from each other and from the line terminals for neutralizing a predetermined part of said reactance, said capacitors being of such size that between any point in said line and either of its terminals the resultant reactance is inductive.

2. In combination, an alternating current power system having a predetermined amount of effective inductive reactance, a transmission lineline having one terminal thereof connected to said system, and a plurality of series capacitors connected so as to divide said line into sections, the capacitance of said capacitors being so correlated to the distributed inductance of said sections that the effective reactance between any point on said line and said terminal is inductive whereby the current resulting from a fault at any point on said line will not exceed the current resulting from a dead short circuit at said terminal.

3. In combination, an alternating current power system, a transmission line, a circuit breaker for interconnecting said system and one terminal of said line, said circuit breaker having a maximum current interrupting ability which is of the order of magnitude of the current resulting from a dead short circuit at said terminal, and a plurality of series capacitors connected so as to divide said line into sections, the capacitance of said capacitors being so correlated to the distributed inductance of said sections that the effective reactance between any point on said line and said terminal is of the same sign as the effective reactance of said system whereby the current resulting from a fault at any point on said line will not exceed the terminal short circuit current.

4. A series capacitor compensated alternating current power transmission system comprising, in combination, a synchronous generator system, a synchronous receiving system, a transmission line interconnecting said systems and having appreciable series distributed inductive reactance, said systems having a predetermined minimum internal inductive impedance which limits the current resulting from a terminal short circuit on said line to a predetermined maximum value, and $n$ substantially equal size series capacitors connected in said line for neutralizing a predetermined amount of said inductive reactance, said capacitors dividing said line into $(n+1)$ substantially equal sections, the size of said capacitors for producing any desired degree of compensation as measured by the ratio of total series capacitor reactance to total line inductive reactance being such that $$\frac{n}{n+1}$$

is equal to or greater than said ratio whereby the maximum current resulting from a short circuit at any point on said line will not exceed said maximum terminal short circuit current.

5. In combination, an alternating current power line, terminal apparatus at each end of said line for sending power therethrough, said line having an objectionable amount of inductance, and means for neutralizing a predetermined fractional part of said inductance comprising series capacitance distributed uniformly on both sides of the center point of said line over a corresponding fractional part of the length thereof, said capacitance being characterized by a reactance per unit of line length which is substantially equal to the reactance per unit of line length of said inductance.

6. In combination, an alternating current power line, terminal apparatus at each end of said line for sending power therethrough, said line having an objectionable amount of inductance, and means for neutralizing a predetermined fractional part of said inductance comprising a single series capacitor installation connected in said line at its electrical mid-point, said capacitor installation having an effective reactance which is equal to the reactance of said predetermined fractional part of said inductance.

7. In combination, an alternating current power line, terminal apparatus at each end of said line for sending power therethrough, said line having an objectionable amount of inductance, and means for neutralizing a predetermined fractional part of said inductance comprising a plurality of equal series capacitor installations connected in a center section of said line, said installations being separated by equal lengths of line, said center section being symmetrical with respect to the electrical midpoint of said line whereby the remaining portions of said line comprise equal end sections, said lengths of line each having an inductive reactance equal to the capacitor reactance of each of said installations.

8. In combination, an alternating current power line, terminal apparatus at each end of said line for sending power therethrough, said line having an objectionable amount of inductance, and means for neutralizing a predetermined fractional part of said inductance comprising $n$ equal series capacitor installations connected in a center section of said line, said center section being divided into $(n+1)$ equal lengths of line by said capacitor, the reactance of said lengths and installations being equal and opposite in sign, the center of said center section substantially coinciding with the center of said line.

9. In combination, an alternating current power line, terminal apparatus at each end of said line for sending power therethrough, said line having a predetermined amount of uniformly distributed inductance, and means for compensating for a predetermined decimal part $C$ of said inductance comprising $n$ substantially equal series capacitor installations which divide said line into $(n+1)$ substantially equal sections, $n$ having a value equal to the whole number nearest to $$\frac{C+\sqrt{C^2-C+1}}{(1-C)}$$

10. In combination, an alternating current power line, terminal apparatus at each end of said line for sending power therethrough, said line having a predetermined amount of uniformly distributed inductance, and means for compensating for a predetermined decimal part $C$ of said inductance comprising $n$ substantially equal series capacitor installations which divide said line into $(n+1)$ substantially equal sections, $n$ having a value equal to a whole number above $$\frac{C+\sqrt{C^2-C+1}}{(1-C)}$$

11. In combination, an alternating current power line, terminal apparatus at each end of said line for sending power therethrough, said line having a predetermined amount of uniformly distributed inductance, and means for compensating for a predetermined decimal part $C$ of said inductance comprising $n$ substantially equal series capacitor installations which divide said line into $(n+1)$ substantially equal sections, $n$ having a value equal to a whole number between $$\frac{C}{(1-C)}$$

and $$\frac{C+\sqrt{C^2-C+1}}{(1-C)}$$

12. A series capacitor compensated alternating current power transmission system comprising, in combination, a synchronous generator system, a synchronous receiving system, a transmission line interconnecting said systems and having appreciable series distributed inductive reactance, said systems having a predetermined minimum internal inductive impedance which limits the current resulting from a terminal short circuit on said line to a predetermined maximum value, and $n$ substantially equal size series capacitors connected in said line for neutralizing a predetermined amount of said inductive reactance, said capacitors dividing said line into $(n-1)$ substantially equal sections between capacitors and two end sections the shortest of which is longer than the sections between capacitors, the size of said capacitors for producing any desired degree of compensation as measured by the ratio of total series capacitor reactance to total line inductive reactance being such that $$\frac{n}{(n+1)}$$

is equal to or greater than said ratio whereby the maximum current resulting from a short circuit at any point on said line will not exceed said maximum terminal short circuit current.

13. In combination, an alternating current power line, terminal apparatus at each end of said line for sending power therethrough, said line having a predetermined amount of inductance, and capacitive means serially connected in said circuit, said capacitive means having a reactance which is a fraction of the inductive reactance of said line, said capacitive means being connected in said line intermediate the terminals thereof so as to divide said line into a center section containing all of said capacitive means and two end sections on either side thereof containing none of said capacitive means, said end sections each having an inductive reactance which is not exceeded by the net capacitive reactance of said center section whereby the current resulting from a line short circuit at either end of said center section will not exceed the current resulting from a line terminal short circuit.

SELDEN B. CRARY.